Figure 1:
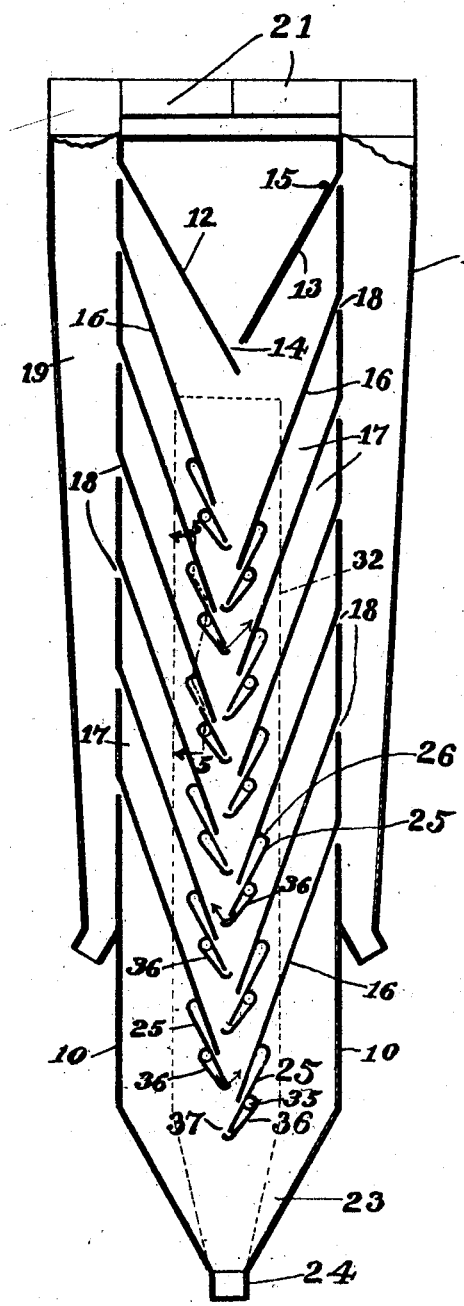

Jan. 10, 1928.

A. H. STEBBINS 1,655,575

CLASSIFIER

Filed Nov. 24, 1926    2 Sheets-Sheet 1

Inventor
Albert H. Stebbins
by Robt O. Harris,
Attorney

Jan. 10, 1928.
A. H. STEBBINS
1,655,575
CLASSIFIER
Filed Nov. 24, 1926    2 Sheets-Sheet 2
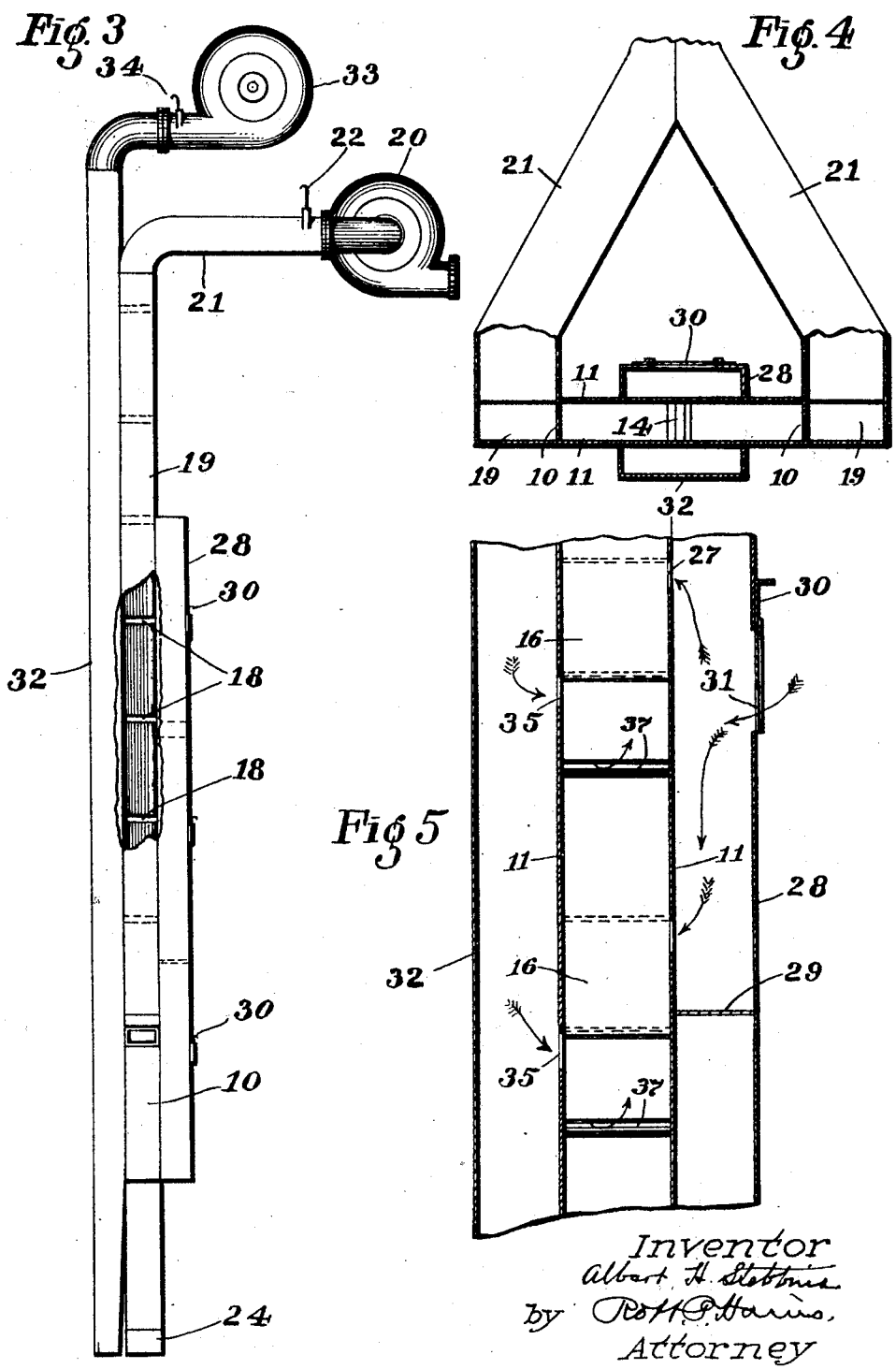

Patented Jan. 10, 1928.

1,655,575

UNITED STATES PATENT OFFICE.

ALBERT H. STEBBINS, OF LOS ANGELES, CALIFORNIA.

CLASSIFIER.

Application filed November 24, 1926. Serial No. 150,410.

This invention relates to classifiers of the type in which the materials passing downwardly within a treatment chamber under the influence of gravity are subjected to the action of air currents that separate the finer particles from the coarser materials.

In employing classifiers of this general type it is difficult to effect a thorough treatment of the materials through the use of an air blast alone, or through an air exhaust alone, and if the materials being treated are relatively fine it is necessary to subject them to successive treatments in order to remove completely the fine particles from the coarser materials.

The present invention is therefore directed to a multiple treatment classifier which is so constructed that the materials passing downwardly through the treatment chamber are subjected time and time again to the separating action of air currents that extract the finer from the larger particles.

One of the features of the present invention resides in a treatment chamber having downwardly inclined plates along which the materials travel and having an air jet adjacent the lower end of each plate for directing a blast of air upwardly through the materials delivered by a plate.

Another feature of the invention resides in the location of the conduits for the air blasts at the under side of the inclined plates whereby air under pressure is supplied at the lower ends of the inclined plates while the use of air passages extending inwardly from a wall of the casing across the settling compartments is avoided.

Another feature of the invention resides in the novel arrangement of parts for supplying air under pressure and from the atmosphere to the interior of the casing near the lower ends of the inclined plates, and in the means for exhausting air from the settling compartments.

Other features of the invention and novel combination of parts in addition to the above will be hereinafter described in connection with the accompanying drawings which illustrate one good practical form of the invention.

In the drawings:—

Figure 2:
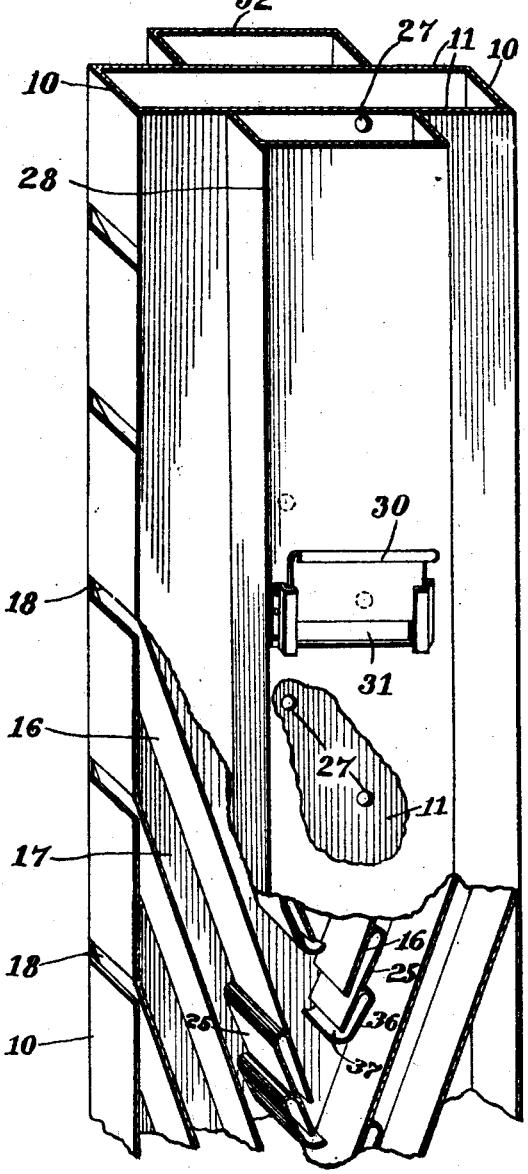

Fig. 1 is a vertical sectional view through a classifier constructed in accordance with the present invention;

Fig. 2 on an enlarged scale is a perspective view of the classifier of Fig. 1, the casing being partly broken away and the exhaust pipes being omitted;

Fig. 3 is a side view of Fig. 1;

Fig. 4 on an enlarged scale is a plan view of Fig. 3 with parts in section; and

Fig. 5 on an enlarged scale is a sectional view taken on the line 5—5 of Fig. 1.

The treatment of the materials in accordance with the present invention is effected in a casing constructed to be supported in an upright position, and it is shown in the drawings as rectangular in cross section. This casing is conveniently formed of sheet metal and has the vertically disposed end walls 10 which are secured to the vertical side walls 11. The materials to be treated are delivered into the treatment chamber formed within the casing by a hopper which in the construction shown is mounted in the upper portion of the casing and is provided with the downwardly converging walls 12 and 13 having the discharge opening 14 adjacent their lower ends, and the size of the opening 14 may be varied by adjusting the sliding gate 15 to control the rate at which the materials are delivered into the treatment chamber.

The materials to be treated pass downwardly through the treatment chamber under the influence of gravity and a number of downwardly inclined plates 16 are mounted within the treatment chamber to direct the materials from one plate to another, and also for the purpose of forming settling compartments within the chamber. The inclination at which the plates 16 are supported will depend to some extent upon the nature of the materials being treated. If the materials are relatively coarse they will slide freely along the inclined plates without tending to cling to the same, in which case the downward inclination of the plates need not be very great, but if the materials being treated are very fine they will tend to cling or stick to the plates 16, and in order to prevent this it will be necessary to mount the plates at a steep inclination, as shown in the drawings.

The length of the treatment chamber and the number of inclined plates 16 employed therein will vary with the nature of the materials to be treated. If the materials to be separated are relatively coarse the desired separation can be effected by comparatively few treatments, in which case a small number of inclined plates 16 may be employed.

If, however, the classifier of the present invention is to be employed to separate fine, dust-like particles it will be necessary to treat the materials over and over again in order to effect their separation, and to accomplish this it will be necessary to make the treatment chamber of sufficient length to provide therein a large number of steeply inclined plates 16.

In the embodiment of the invention shown in the drawings the plates 16 are mounted to slope downwardly from the opposite end walls 10 of the casing towards the central portion of the casing so that the materials are directed back and forth by the inclined plates from one plate to the other as they move downwardly within the casing. Between the adjacent inclined plates 16 at each side of the casing are formed the settling compartments 17. It is desirable to exhaust air from the upper portion of these compartments 17 to remove from the treatment chamber the lighter particles that remain suspended in the air. This is accomplished in the embodiment of the invention shown by providing the air exhaust openings 18 in the end walls 10 of the casing, and the air is exhausted through these openings by providing the exhaust pipes 19 which extend downwardly along each vertical end wall 10 of the casing. Air may be exhausted from each of the pipes 19 by an exhaust fan 20 having the laterally extending branch pipes 21 (see Fig. 4) that lead from the fan to the upper end of the pipes 19. The volume of air removed from the treatment chamber by the exhaust fan 20 may be controlled as desired by adjusting the sliding gate 22 mounted adjacent the fan.

The separation of the materials passing downwardly within the treatment chamber is effected by directing a blast of air against the materials at a point near the lower end of each inclined plate 16, the arrangement being such that the lighter materials are blown by the air blast into an adjacent settling compartment 17. The particles that settle in this compartment will slide down the inclined plate 16 of said compartment into the path of another air blast, whereupon they will be blown into another compartment 17 for retreatment. In this manner the materials are treated over and over again as they pass downwardly within the casing and the lighter materials that remain suspended in the air are carried off by the exhaust pipes 19 while the heavier materials work their way downwardly into the hopper 23 at the lower end of the casing, from which they may be drawn from time to time through the discharge spout 24.

The strength of the air blasts introduced within the treatment chamber adjacent the lower end of each inclined plate 16 may be controlled by means to be described and, as above stated, the volume of air exhausted from the treatment compartments 17 may be controlled by adjusting the sliding gate 22. It will be apparent that if the volume of air exhausted from the treatment chamber exceeds the amount of air introduced into the chamber by the air blasts, a partial vacuum will be produced within the treatment chamber which will effect the separation of the materials. It may therefore be desirable to admit air into the casing from the atmosphere, and one of the features of the present invention resides in means for introducing air from the atmosphere into the casing adjacent the lower end of each inclined plate 16. This is accomplished in the construction shown by providing a conduit forming strip of material 25 at the under face of each inclined plate 16 adjacent the lower end thereof, and the upper portion of each strip 25 is bent, as best shown in Fig. 2, to form a transversely extending end portion 26 which communicates with an opening 27 formed in a side wall 10 of the casing, the arrangement being such that air from the atmosphere which enters an opening 27 will be introduced into the casing adjacent the lower end of an inclined plate 16 along which the particular conduit forming strip 25 extends. The air which is introduced from the atmosphere at the lower end of each of the inclined plates 16 will rise in the casing under the influence of the exhaust produced by the exhaust pipes 19, and as a result will pass upwardly through the materials sliding along the adjacent inclined plates 16 as these materials reach the lower ends of the plates to remove therefrom the finer particles.

It may be desirable to control the amount of air permitted to enter the treatment chamber through the openings 27 and this is accomplished in the construction shown by providing a suction inlet pipe 28 that extends lengthwise of the side wall 11 of the casing, and this pipe is divided into any desired number of compartments by the transversely extending partitions 29. The amount of air permitted to enter a portion of the pipe 28 lying between two partitions 29 may be regulated as desired by adjusting a sliding gate 30 mounted upon the outer wall of the pipe 28 and which controls the size of the air inlet opening 31.

An important feature of the present invention, as above indicated, resides in the construction whereby the means for admitting air from the atmosphere and for introducing an air blast into the casing adjacent the lower end of each downwardly inclined plate 16 shall not obstruct the entrance to the settling compartment 17. The means for introducing the air blasts into the casing, as well as the means just described for admitting air from the atmosphere, are therefore located adjacent the under face of the downwardly inclined plate 17 so that the air blast means will not obstruct the entrance to the settling compartments 17.

In order to produce the desired air blast within the treatment chamber, an air blast pipe 32 is provided that extends lengthwise of a side wall 11 of the casing opposite the pipe 28, and air under pressure will be supplied to the pipe 32 by the blast fan 33.

The strength of air supplied to the pipe 32 by this fan may be controlled by adjusting the sliding gate 34. The air from the blast pipe 32 is led into the treatment chamber through openings 35 formed in a side wall of the casing, and each of these openings communicates with an air blast conduit formed at the under face of a strip 25 above mentioned. These air blast conduits are formed by providing a plate 36 adjacent the under face of each strip 25, and the upper end of each plate 36 is bent as shown in the drawings to close the upper portion of the air blast conduit, while the lower end of each plate 36 is bent around the lower end of the adjacent strip 25 to form an air blast opening 37 which directs a blast of air upwardly in the direction indicated by the arrows across the path of the materials sliding down the adjacent inclined plate 16. The arrangement is such that the materials directed by an inclined plate into the path of an air blast will be blown upwardly into an adjacent treatment compartment 17, as above pointed out.

From the foregoing description, when read in connection with the drawings, it will be seen that the strength of the air blasts employed in effecting the desired separation of the materials may be varied as desired by adjusting the sliding gate 34, and that the strength of the air exhaust means may be regulated by adjusting the sliding gate 22; it also will be understood that the amount of air introduced into the treatment chamber from the atmosphere may be controlled as desired by adjusting the sliding gates 30 which control the air admitted to the different air compartments of the pipe 28. Through the proper adjustment of the gates just mentioned the treatment of the materials within the classifier may be carefully regulated, and since the materials passing downwardly within the classifier are subjected time and time again to the separating action of air passing through the materials, the fine particles may be completely removed from the slightly heavier particles, thus effecting the desired separation.

What is claimed is:—

1. A classifier, comprising in combination, an upright casing constructed to provide a treatment chamber, means for delivering the materials to be treated into the upper portion of the chamber to move downwardly therein under the force of gravity, a series of downwardly inclined plates mounted in the chamber to receive the falling materials, means adjacent the lower end of each inclined plate for directing a blast of air upwardly across the path of the materials sliding along the respective plates to carry the lighter particles upwardly away from the plate that delivers the materials to a particular air blast, and means for removing from the chamber the lighter particles that remain suspended in the air.

2. A classifier, comprising in combination, an upright casing constructed to provide a treatment chamber, means for delivering the materials to be treated into the upper portion of the chamber to move downwardly therein under the force of gravity, a series of downwardly inclined plates mounted in the chamber to receive the falling materials, means adjacent the lower end of each inclined plate for directing a blast of air upwardly across the path of the materials sliding along the respective plates to carry the lighter particles upwardly away from the plate that delivers the materials to a particular air blast, means for introducing air from the atmosphere into the chamber to pass upwardly through the materials, and means for removing from the chamber the lighter particles that remain suspended in the air.

3. A classifier, comprising in combination, an upright casing constructed to provide a treatment chamber, means for delivering the materials to be treated into the upper portion of the chamber to move downwardly therein under the force of gravity, a series of downwardly inclined plates mounted in the chamber to receive the falling materials, conduit means for introducing air under pressure into the chamber adjacent the under face of each plate and provided with a nozzle for directing a blast of air upwardly across the path of the materials sliding along the respective plates to carry the lighter particles upwardly within the casing, and means for removing from the chamber the lighter particles that remain suspended in the air.

4. A classifier, comprising in combination, an upright casing constructed to provide a treatment chamber, a series of inclined plates mounted in the casing so that they extend downwardly from the opposite sides of the casing to direct the materials from one plate to another, means for delivering the materials to be treated into the upper portion of the casing to pass downwardly therein under the force of gravity, means for introducing a blast of air into the chamber at the lower end of each plate to pass upwardly across the path of the materials sliding downwardly along a plate, and means for removing from the casing the lighter particles that remain suspended in the air.

5. A classifier comprising in combination, an upright casing constructed to provide a treatment chamber, a series of inclined plates mounted in the casing so that they extend downwardly from the opposite sides of the casing to direct the materials from one plate to another, means for delivering the materials to be treated into the upper portion of the casing to pass downwardly therein under the force of gravity, means for introducing a blast of air into the chamber at the lower end of each plate to pass upwardly across the path of the materials sliding downwardly along a plate, means for introducing air from the atmosphere into the casing to rise therein, and means for removing from the casing the lighter particles that remain suspended in the air.

6. A classifier, comprising in combination, an upright casing constructed to provide a treatment chamber, a series of inclined plates mounted within the casing so that they extend downwardly from the opposite sides of the casing to direct the materials from one plate to another, means for delivering the materials to be treated into the upper portion of the casing to pass downwardly therein, an air supply conduit formed beneath each plate and having an air blast nozzle adjacent the lower end of the plate for forcing air upwardly through the materials sliding down the inclined plate, means for introducing air under pressure into the conduit through a side wall of the casing transversely of the plate, and means for removing from the casing the lighter particles that remain suspended in the air.

7. A classifier, comprising in combination, an upright casing constructed to provide a treatment chamber, a series of inclined plates mounted within the casing so that they extend downwardly from the opposite sides of the casing to direct the materials from one plate to another and arranged to form settling compartments between the plates, means for delivering the materials to be treated into the upper portion of the casing to pass downwardly therein, an air supply conduit formed beneath each plate and arranged so as not to extend across or close the settling compartment between the adjacent plates and having a discharge end for directing a blast of air through the materials sliding down a plate, and means for exhausting air from said compartments.

8. A multiple treatment classifier, comprising in combination, an upright casing constructed to provide a treatment chamber, a series of inclined plates mounted in the casing to extend downwardly from the opposite sides of the casing in staggered relation and arranged to form settling compartments within the chamber, means for delivering the materials to be treated into the upper portion of the casing to pass downwardly therein, means for producing a jet of air adjacent the lower end of each inclined plate to blow the lighter materials sliding down an inclined plate upwardly into the opposite settling compartment so that they are blown alternately into the opposite compartments, and means for removing from the compartments the lighter particles that remain suspended in the air.

9. A multiple treatment classifier, comprising in combination, an upright casing having vertical side and end walls and constructed to form a treatment chamber, a series of inclined plates mounted in the casing to extend downwardly from the opposite vertical end walls of the casing to direct the materials from one plate to another, means for delivering the materials to be treated into the upper portion of the casing to pass downwardly therein, an air blast pipe extending lengthwise of the casing, an air conduit formed beneath each inclined plate and communicating with said pipe through a side wall of the casing and each conduit having a discharge end adjacent the lower end of a plate and adapted to blow air upwardly through the materials traveling down the plate as they reach the lower end thereof, and means for removing from the casing the particles that remain suspended in the air.

10. A multiple treatment classifier, comprising in combination, an upright casing having vertical side and end walls and constructed to form a treatment chamber, a series of inclined plates mounted in the casing to extend downwardly from the opposite vertical end walls of the casing to direct the materials from one plate to another, means for delivering the materials to be treated into the upper portion of the casing to pass downwardly therein, an air blast pipe extending lengthwise of the casing, an air conduit formed beneath each inclined plate and communicating with said pipe through a side wall of the casing and each conduit having a discharge end adjacent the lower end of a plate and adapted to blow air upwardly through the materials traveling down the plate, means for introducing air from the atmosphere into the casing adjacent the lower end of the inclined plates through the opposite side wall, and means for removing from the casing the particles that remain suspended in the air.

11. A multiple treatment classifier, comprising in combination, an upright casing having vertical side and end walls and constructed to form a treatment chamber, a series of inclined plates mounted in the casing to extend downwardly from the opposite vertical end walls to direct the materials from one plate to another and arranged to form settling compartments between them, a suction conduit extending lengthwise of each of said end walls to exhaust air from said compartments, means for delivering the materials to be treated to the upper portion of the casing to pass downwardly therein, and means for delivering air under pressure into the casing through a side wall thereof and for directing a jet of air upwardly through the materials adjacent the lower end of each plate so that the materials will be carried by the air jets alternately into the settling compartments at the opposite sides of the casing.

12. A multiple treatment classifier, comprising in combination, an upright casing having vertical side and end walls and constructed to form a treatment chamber, a series of inclined plates mounted in the casing to extend downwardly from the opposite vertical end walls to direct the materials from one plate to another and arranged to form settling compartments between them, a suction conduit extending lengthwise of each of said end walls to exhaust air from said compartments, means for delivering the materials to be treated to the upper portion of the casing to pass downwardly therein, means for delivering air under pressure into the casing through one side wall thereof to produce air blasts in the casing that are directed across the path of the materials sliding along said plates, and means for introducing air from the atmosphere into the casing through the opposite side wall.

13. A classifier, comprising in combination, an upright casing constructed to provide a treatment chamber, means for delivering the materials to be treated into the upper portion of the chamber to move downwardly therein, a series of inclined plates mounted in the casing so that they extend downwardly from the opposite sides of the casing to direct the materials from one plate to another, an air blast pipe extending along a side wall of the casing adjacent the inner ends of said plates, conduits for conducting air under pressure from said pipe to the lower ends of the inclined plates to produce air jets that are directed upwardly through the materials traveling lengthwise of said plates, adjustable means for admitting air from the atmosphere into the casing through the opposite wall thereof, and means for removing from the casing the light particles that remain suspended in the air.

In testimony whereof, I have signed my name to this specification.

ALBERT H. STEBBINS.